(12) United States Patent
Daniel

(10) Patent No.: US 7,597,925 B2
(45) Date of Patent: Oct. 6, 2009

(54) METHOD OF CONFINING DROPLETS OF DISPLAY FLUID

(75) Inventor: Jurgen H. Daniel, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 406 days.

(21) Appl. No.: 10/879,774

(22) Filed: Jun. 28, 2004

(65) Prior Publication Data

US 2005/0285921 A1      Dec. 29, 2005

(51) Int. Cl.
B05D 5/06    (2006.01)

(52) U.S. Cl. .................. 427/58; 427/421.1; 427/508; 345/107

(58) Field of Classification Search ... 427/421.1–427.7, 427/58, 508; 345/107
See application file for complete search history.

(56) References Cited

U.S. PATENT DOCUMENTS

| | | | | |
|---|---|---|---|---|
| 4,068,927 A | * | 1/1978 | White | .................. 359/296 |
| 6,503,831 B2 | * | 1/2003 | Speakman | .................. 438/674 |
| 2001/0005567 A1 | * | 6/2001 | Harada et al. | .................. 430/32 |
| 2002/0008898 A1 | * | 1/2002 | Katase | .................. 359/296 |
| 2002/0131147 A1 | * | 9/2002 | Paolini et al. | .................. 359/296 |
| 2002/0135860 A1 | * | 9/2002 | Iwanaga et al. | .................. 359/296 |
| 2002/0166771 A1 | * | 11/2002 | Kanbe | .................. 204/600 |
| 2003/0013238 A1 | * | 1/2003 | Ogawa | .................. 438/151 |
| 2003/0063369 A1 | * | 4/2003 | Kawai | .................. 359/296 |
| 2003/0086149 A1 | * | 5/2003 | Kawai | .................. 359/296 |
| 2003/0224102 A1 | * | 12/2003 | Minami | .................. 427/58 |

\* cited by examiner

*Primary Examiner*—Timothy H Meeks
*Assistant Examiner*—Jimmy Lin
(74) *Attorney, Agent, or Firm*—Kent Chen

(57) ABSTRACT

An improved method of forming a display is described. The method describes depositing droplets of a display fluid into a sealing solution. The sealing solution seals the droplets of display fluid such that each droplet forms a miniature cell of display fluid. Electrodes address charged particles in the miniature cells to form viewable images for use in a display.

28 Claims, 8 Drawing Sheets

METHOD OF CONFINING DROPLETS OF DISPLAY FLUID

BACKGROUND

In recent years, reflective display technologies that are thin, light and flexible have been developed. One type of display that has those characteristics is electrophoretic displays.

Many electrophoretic displays include micro-cells filled with an electrophoretic ink. The micro-cells help reduce agglomeration and settling of the ink particles. Electrodes on either side of each microcell apply an electric field to the electrophoretic ink. The electric field moves charged particles in the ink. By controlling the electric field applied to the microcells, the movement of charged particles can be adjusted to form a display image.

During fabrication of electrophoretic displays, several techniques have been used to form the displays and seal the micro-cells. Example techniques used to make electrophoretic displays are described in United States patent application number U.S. 2002/0196525 A1 entitled "Process for Imagewise Opening and Filling Color Display Components and Color Displays Manufactured Thereof" by Xianhai Chen et al. as well as, PCT application number WO 01/67170 entitled "Electrophoretic Display" by Rong-Chang Liang et al. Both Patent applications are hereby incorporated by reference.

One method of sealing the micro-cells after deposition of the electrophoretic ink involves laminating a cover sheet onto the cells. However, the sealing method described usually uses adhesives or polymers. The adhesives used to seal the ink can displace the ink in the microcells during the sealing process. The displacement of the ink by the adhesive can significantly degrade display performance or reduce fabrication yield Thus an improved method of forming and sealing cells in a display is needed.

SUMMARY

A method of sealing cells in a display is described. The method includes the operation of depositing a sealing solution. A droplet of display fluid is ejected into the sealing solution such that the droplet of display fluid is immersed in the sealing solution. At least a portion of the sealing solution solidifies to form a solid portion such that the solid portion seals the droplet of display fluid to prevent intermixing of the droplet of display fluid with other droplets of display fluid.

DETAILED DESCRIPTION

A method of fabricating a display is described. The display includes a number of cells or chambers. Independently addressable pixels in the display change states according to an applied electric field. Each pixel may cover one cell, several cells or a fraction of a cell. A typical example of such a display is an electrophoretic display.

Figure 1:
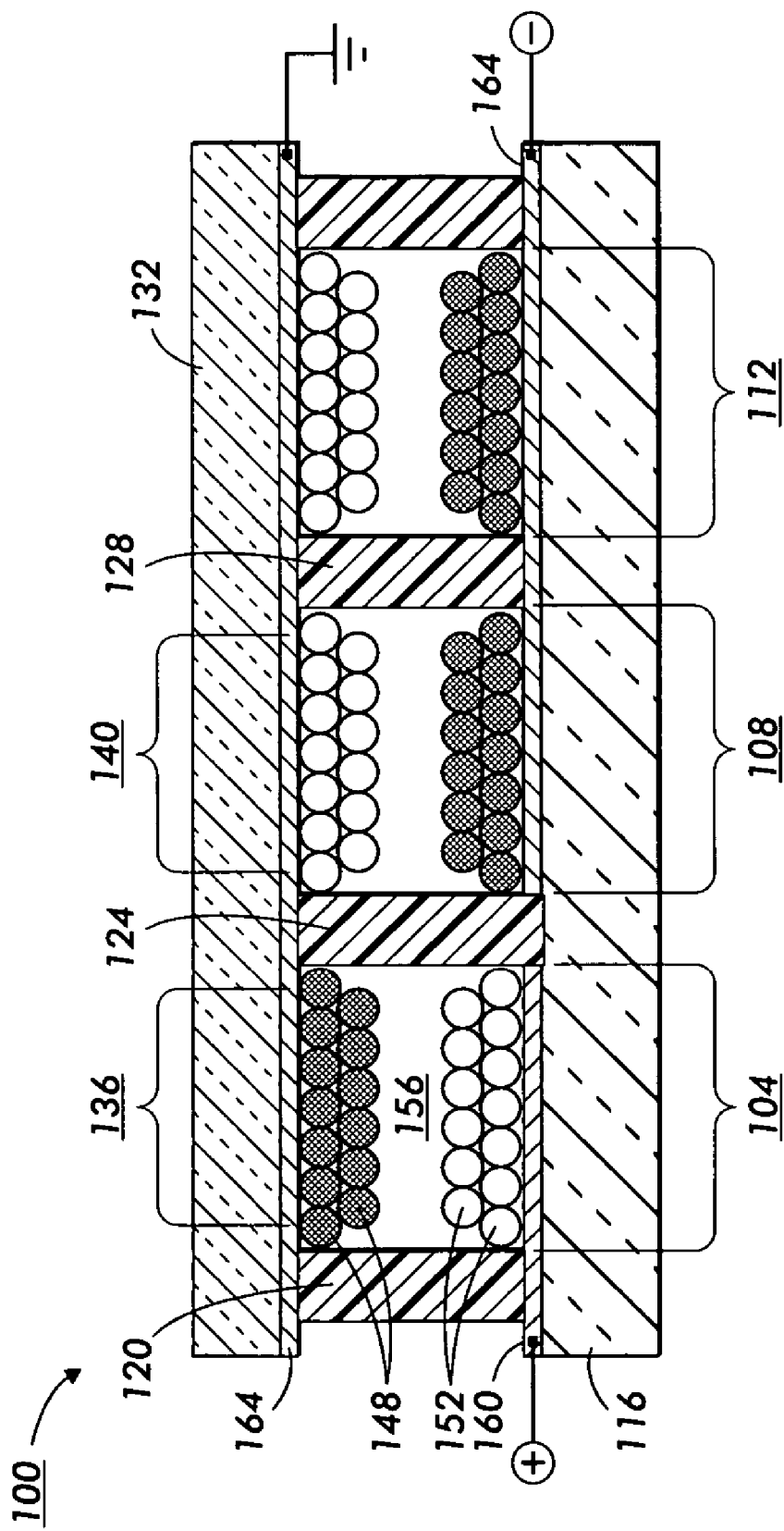
FIG. 1 shows a side cross sectional view of a two particle electrophoretic display.

FIG. 1 shows a cross sectional view of an electrophoretic display 100. A plurality of cells 104, 108, 112 are formed over a substrate 116. Cell walls 120, 124, 128 separate cells 104, 108, 112. Cell walls also support transparent cover layer 132. In one design, substrate 116 includes electronics such that substrate 116 forms the display "backplane". Typically both substrate 116 and transparent cover layer 132 may be formed from glass, although a variety of media may be used. When fabricating flexible, paper-like displays, substrate 116 and cover layer 132 may be manufactured from flexible materials such as polymeric materials (e.g. Mylar™ from DuPont Corporation).

A deposition mechanism, such as an ink jet printer, deposits a display fluid such as an electrophoretic ink 136 inside each cell. In general, a display fluid may be any liquid that changes, at least to an observer viewing the droplet from at least one direction, either color, or light transmissivity depending on an applied electric field. Examples of display fluids include inks suitable for electrophoretic displays and "inks" for liquid crystal displays. For convenience, the specification will describe the display fluid as an electrophoretic ink, however, it should be understood that other fluidic materials that change states according to an applied electric field may also be used.

FIG. 1 shows a two particle electrophoretic ink 136. In the illustrated embodiment, electrophoretic ink 136 includes a first set of charged particles 148 of a first color and a second set of oppositely charged particles 152 of a second color. The charged particles are suspended or move through a clear carrier liquid 156. In an alternate embodiment, the electrophoretic ink may be a one charge particle ink. A one charge particle ink typically uses a single set of charged particles that move through a color dyed liquid carrier.

An electric field generated by electrodes 160, 164 moves the charged particles though the liquid. Many different conducting materials may be used to form electrodes 160, 164, however, making top electrode 164 transparent improves display image quality. In one embodiment, top electrode 164 is formed from a transparent conductive material such as ITO (indium tin oxide). Bottom electrode 160 may be coupled to a variety of circuits well known in the art, including active matrix pixel array structures. The circuits control the electrode voltages and thus the electric field applied to the ink particles.

Cell walls 120, 124, 128 prevent movement of charged particles between adjacent cells. Such movement can cause particle agglomeration and particle settling, such as when the display is held upright. The cell wall height typically ranges from about 5 microns to 200 microns. A variety of techniques including etching, printing, molding and photolithography, may be used to form the cell walls. In one embodiment, each cell within the cell walls represents one pixel in a display. However, in alternate embodiments, each pixel may correspond to several cells or portions of a cell. In still another embodiment, cell walls are completely eliminated, instead, electrodes' 160, 164 shape and size define the display pixels and control pixel and image formation.

Although cell walls are not necessary to form a display image problems arise when barriers to electrophoretic ink flow across a display surface are completely removed. For example, when barriers are removed, bending of the display can cause excessive charged particle movement thereby reducing the display image quality. Furthermore, electrophoretic ink flow between cells can create particle gradients that result in display and image deterioration. Thus when cell walls are eliminated, other barriers to electrophoretic ink flow should be substituted. One substitution that will be described in detail is to use a droplet seal itself as the barrier. Such displays will be described in the description accompanying FIGS. 8-13.

Figure 2:
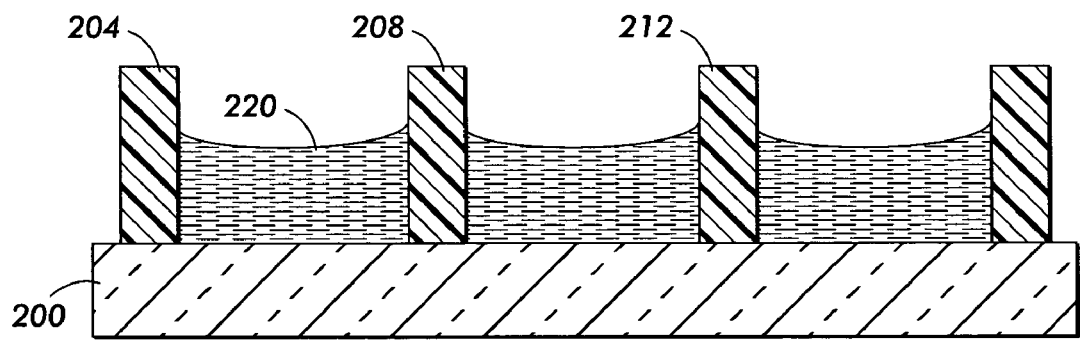
FIG. 2-6 show a cross sectional side view of a display at various stages of fabrication.
Figure 6:
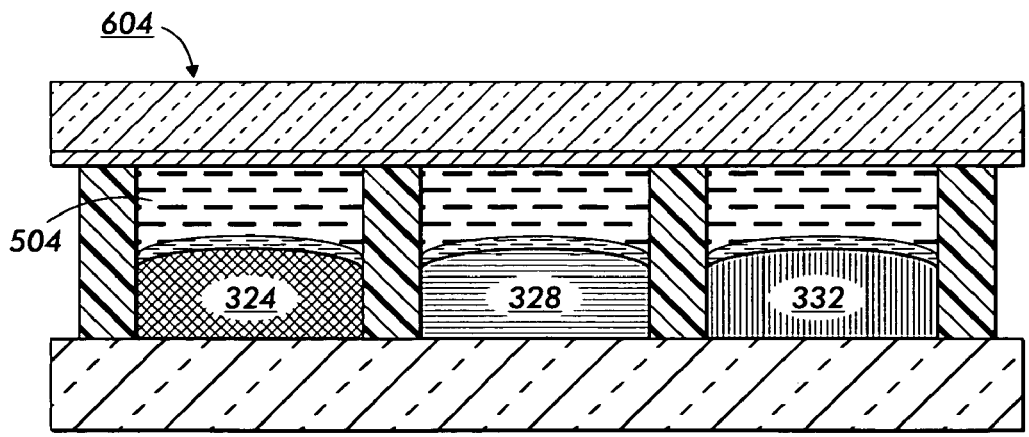

FIG. 2 though FIG. 6 shows one method of forming the cell structure of FIG. 1. FIG. 2 shows cell walls 204, 208, 212 formed over a substrate 200. The cell walls may be formed by various techniques including printing, etching, photolithographic patterning and/or molding techniques. Recent developments have enabled the patterning of electronic circuits using printing techniques, including the printing of transistors such as organic transistors. When printed transistors are used in a printed display backplane, printing the walls enables fabrication of the display entirely using printing techniques. The cell walls may be printed using waxes or photocurable inks. Using printing techniques for the display medium also enables accurate registration between the backplane and the display medium.

A sealing solution 220 is deposited in the cells formed by the cell walls. The sealing solution may be deposited using a variety of techniques including doctorblading, dipcoating, curtain coating, spray coating, dispensing or printing the solution into the cells. In one embodiment, the sealing solution consists typically of a polymer dissolved in a solvent. A specific example is a fluorocarbon solution such as Cytop CTX-809A from Asahi Chemicals dissolved in a fluoro-solvent such as a Cytop solvent CT-SOLV180 including Perfluorotrialkylamine, also from Asahi Chemicals, in a ratio of 1 volume part Cytop polymer to 3 volume parts of solvent. Using a solvent that evaporates results in a thin film that eventually seals the droplets.

Not all sealing solutions contain a solvent. For example, other fluorocarbon polymers such as two-component Fluorothane™ by Cytonix and UV-curable FluorN™, also manufactured by Cytonix may be used for sealing solution 220 without a solvent. In the case of UV-curable materials, UV radiation causes cross linking of the molecules to convert the sealing solution from a liquid to a solid and sealing the droplet of display liquid.

Figure 3:
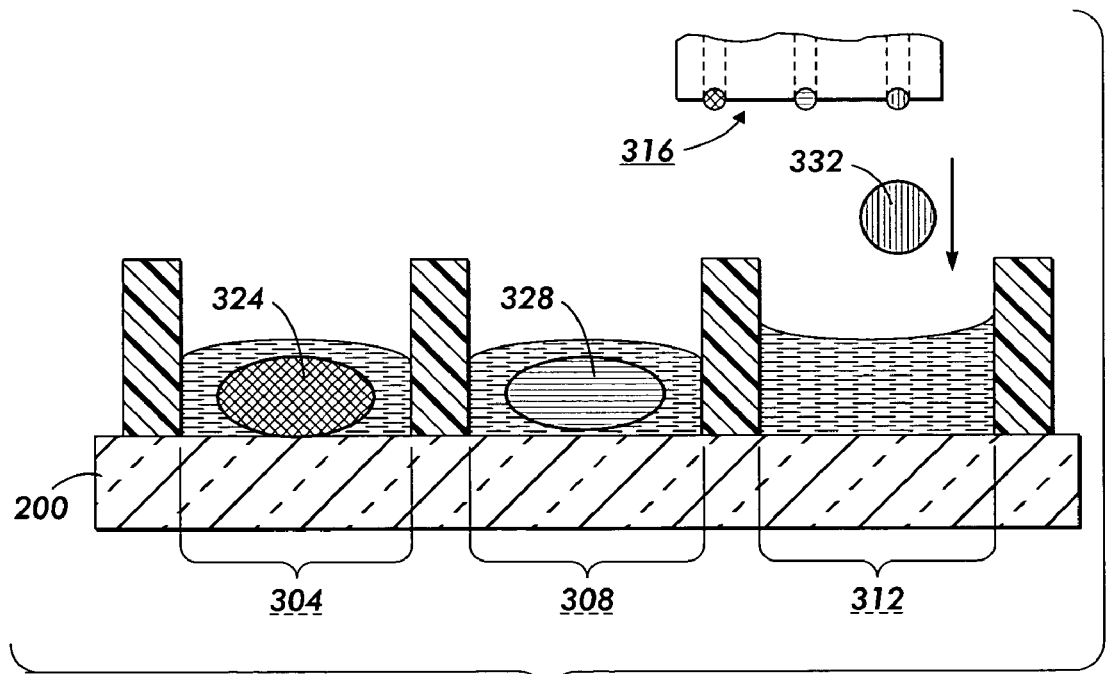

In FIG. 3, a print head, such as print head 316, deposits colored ink into each cell 304, 308, 312 containing sealing solution 220. Print head 316 ejects ink droplets typically using ink jet or quill-pin techniques. The print head could include a single or multiple ejectors and each cell may be filled with a single drop or with multiple small drops. A variety of droplet ejection technologies may be used, including but not limited to piezo-electric, thermal, and acoustic inkjet. In a color display, different colored droplets are deposited in adjacent cells. In three adjacent cells of a RGB style display, one cell may be filled with red ink, a second with green ink and a third adjacent cell with blue ink. In more accurate color systems, additional colors such as cyan, magenta and yellow may be added for achieving a display with a wider color gamut. In known text regions, a black/white pixel may be added (e.g. RGBW) to achieve a better display white state. The color that may be used and the possible distribution include a variety of geometric patterns which are known in the art of display technologies.

Ink chemistry is selected such that once each ink droplet 324, 328, 332 enters sealing solution 220, it becomes immersed into the sealing solution. In the illustrated embodiment of FIG. 3, the ink droplet 324 does not wet the underlying substrate. Instead, the droplet 324, 328, 332 remains suspended by or encapsulated in the sealing solution. In an alternate embodiment, shown in FIG. 4 (shown is the state in which at least most of the solvent has evaporated), the droplets sink to the bottom and wet substrate 200 surface by displacing sealing solution 220. In such a "tenting effect", the ink is sometimes denser than the sealing solution 200. However in other cases, such as when Cytop or Isopar based inks are used, the ink may be less dense than the sealing solution and the immersion into the sealing solution results at least partially from surface tension forces. For purposes of this patent, both embodiments shall be considered sealed by sealing solution, whether the sealing solution fully encapsulates the droplet or whether the sealing solution seals the droplet in conjunction with other surfaces. As used herein, "encapsulated" means completely surrounds. As used herein, "sealing" merely means to create a container, with or without the cooperation of adjacent surfaces, that prevents the sealed liquid from exiting the container.

The operation of immersing the ink droplet may result from gravity, or surface tension or a combination of the two. Thus the ink and sealing solution should be chosen such that surface tension effects and relative densities cause sealing solution to cover the ink droplet. One example of a suitable ink is an ink based on isoparaffinic solvents such as Isopar™ from Exxon Corporation. Other inks that also are suitable include hydrocarbon-based inks and silicone-oil inks. Typical charged particles in the ink may include titanium dioxide mixed with polymers to produce white, carbon based particles mixed with polymer to produce black. A detailed description of other traditional compounds for electrophoretic inks is provided in U.S. Pat. No. 6,017,584 entitled "Multi-color electrophoretic displays and materials for making the same" by Albert et al. which is hereby incorporated by reference. An example of a sealing solution is a fluorocarbon solution such as Cytop in solvent although other sealing materials may also be used. Ink and sealing material are selected such that both don't 'substantially' intermix. (of course most materials are miscible on the molecular level to a certain degree). When a fluorocarbon sealing solution is used, the thin film is typically a fluorocarbon film.

Figure 4:
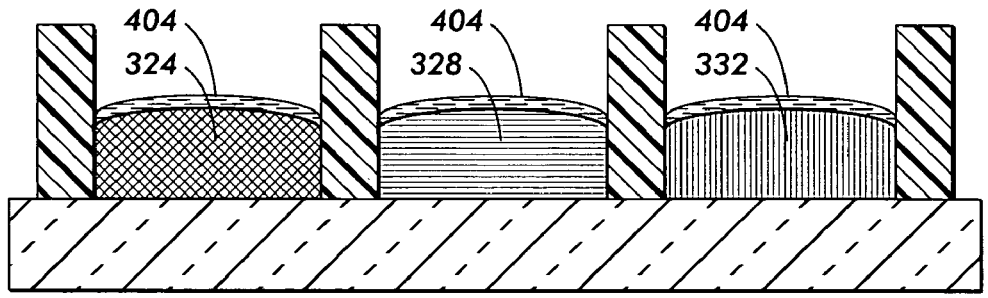

In the example of FIG. 4, after the solvent carrying the sealing polymer evaporates, a thin solid layer, or thin sealing film 404 remains sealing ink droplets 324, 328, 332. The thin sealing layer may be a fluorocarbon film such as Cytop. As previously described, the sealing film may completely surround the droplet or may seal the droplet in conjunction with the substrate and/or other cell walls. The height of each droplet is typically between 5 and 200 microns while the thickness of the film is less, typically between 100 nm and 5 microns. The actual thicknesses may vary widely, and depends heavily on the polymer concentration in the sealing solution. The tolerance for film thickness also depends on the droplet size, for smaller ink drops thinner films are preferred; for larger ink drops thicker films may be suitable. As used herein, "thin" means the film layer is less than the height of the ink droplet.

Figure 5:
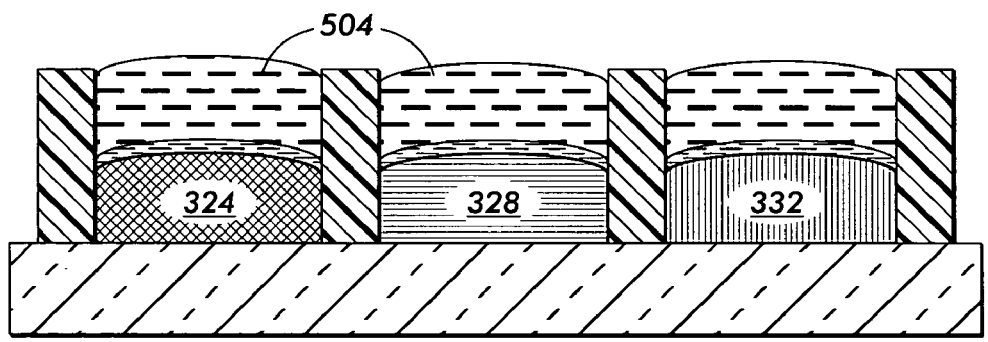

FIG. 5 shows strengthening material 504 deposited over the sealed ink droplets. Strengthening material 504 may be deposited by doctorblading, dip-coating, curtain-coating, spray-coating, printing or a host of other deposition techniques. Strengthening material 504 provides mechanical strength to the display and may be optically transparent, particularly if the display is to be viewed from the top. Polymers including elastomeric polymers serve as excellent strengthening materials.

FIG. 6 shows a cover layer 604 deposited over strengthening material 504. Cover layer 604 may be formed using laminating, printing or other coating techniques. In an electrophoretic display, cover layer 604 also may include a counter electrode used to generate the electric field that moves the charged particles in ink droplets 324, 328, 332. The counter electrode may be made from a transparent material to allow viewing of the image formed by the charged particles in droplets 324, 328, 332. Examples of transparent coatings that could be formed with a printing technique, or general liquid coating technique include, but are not limited to the clear conductive ink Electrodag PF-427 from Acheson Colloids Company, Michigan and, the carbon nanotube Invisicon™ inks from Eikos of Franklin, Mass. As previously described, the counter electrode 604 could also be a laminated sheet of ITO coated Mylar.)

Figure 7:
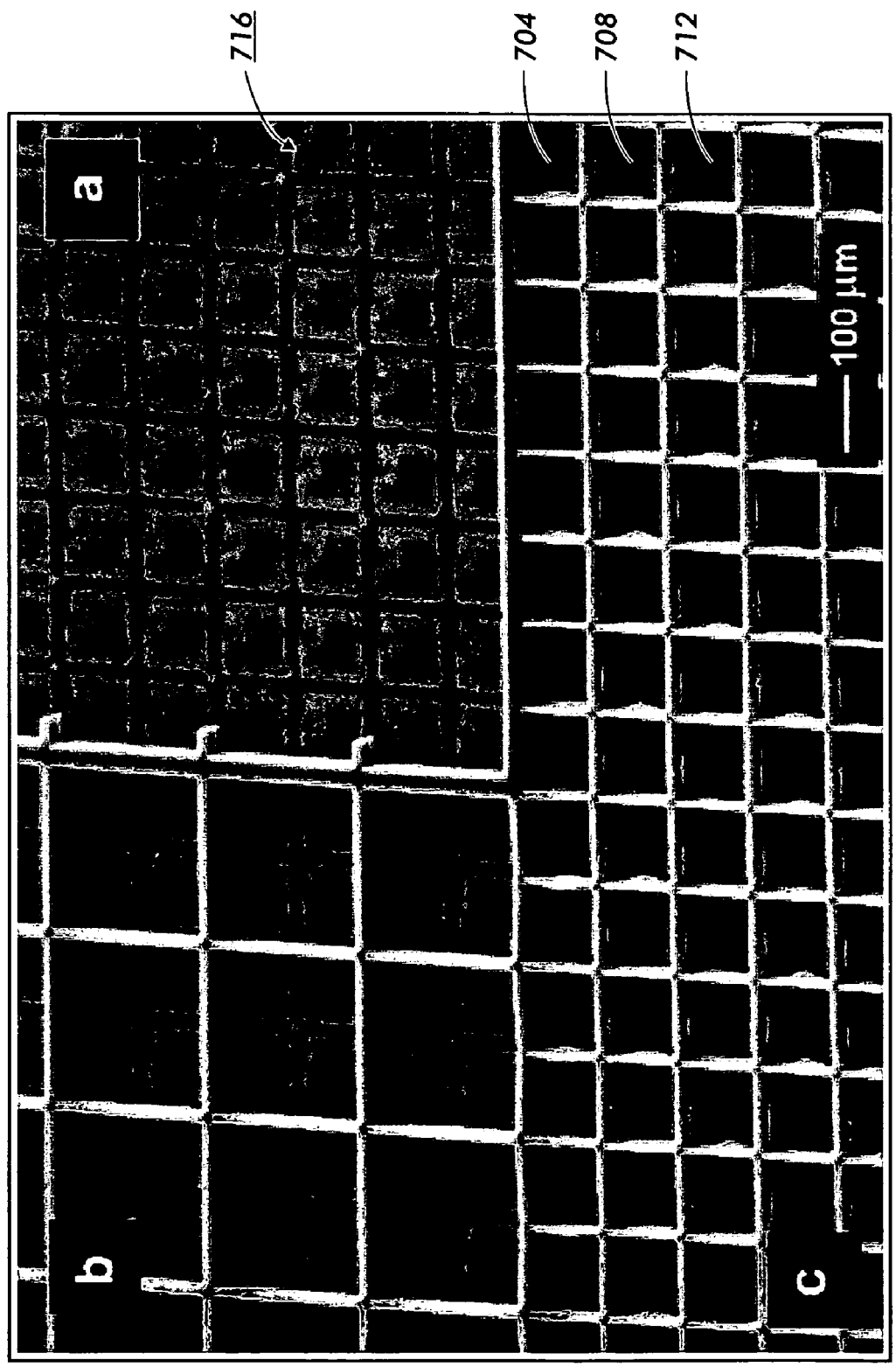
FIG. 7 shows a two dimensional top view of a display during fabrication.

FIG. 7 shows a top view of a two dimensional array of cells 704, 708, 712 in a display system. Backplane 716 includes driver electronics that control the state of pixels in each cell. In one embodiment, an active matrix circuit drives each pixel, although passive matrix circuits as well as other control circuitry may also be used.

The structures of FIGS. 1-7 include cell walls formed prior to ink droplet deposition. These cell walls separate droplets and provide a barrier to ink fluid flow across a display surface. However, when the sealing film has sufficient strength, the sealing film can itself, with or without the cooperation of a strengthening material, serve as a barrier or "wall" that controls display fluid movement. FIGS. 8-13 shows examples of a display that relies on the sealing material as the primary barrier to lateral movement across the display surface and operations used to form such a display.

Figure 8:
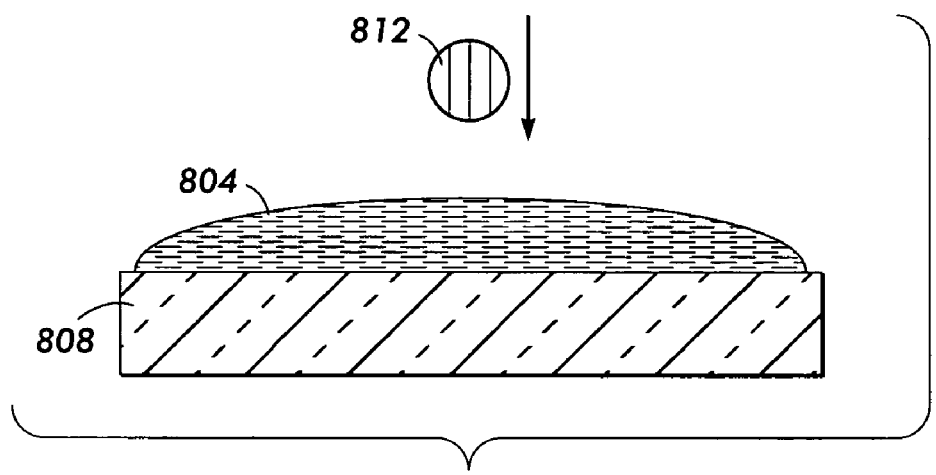
FIG. 8-10 shows the forming of sealed fluid droplets.
Figure 9:
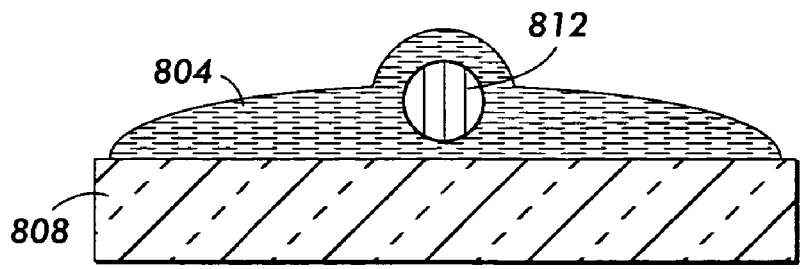
Figure 10:
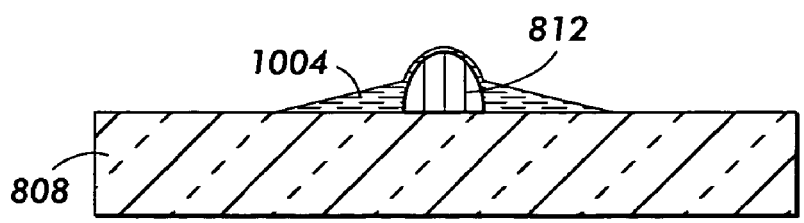

FIG. 8-10 shows the operations used to form a low fill factor display structure that relies primarily on the sealing layer to prevent lateral display fluid movement. In FIG. 8, sealing solution 804 is deposited on a substrate 808. An ink droplet 812 is ejected into sealing solution 804. In one example, the sealing solution is a solution of a fluorocarbon polymer, although other materials may be used. The ink droplet is typically a hydrocarbon, such as Isopar from Exxon, that includes charged colored particles although other ink materials may be used.

FIG. 9 shows ink droplet 812 immersed in (surrounded by) sealing solution 804. Over time, a carrier such as a solvent in sealing solution 804 evaporates leaving a thin solid portion or thin film that seals ink droplet 812. FIG. 10 shows ink droplet 812 sealed by thin film 1004.

Figure 11:
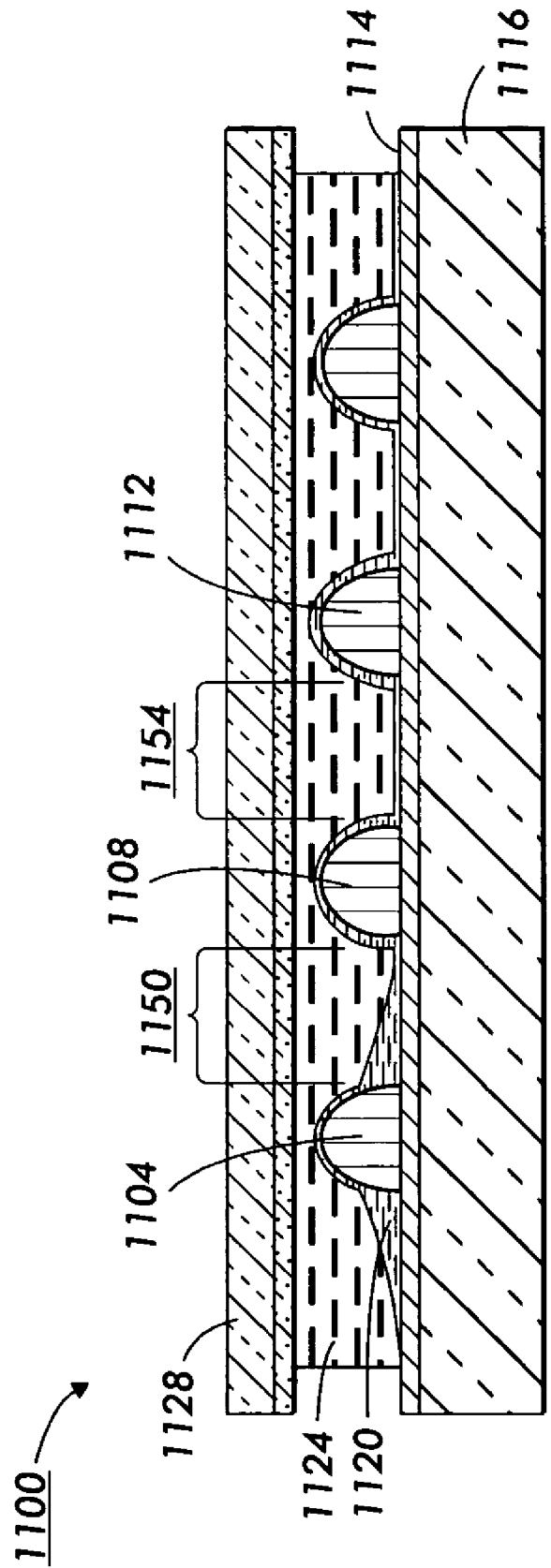
FIG. 11 shows a simple display using the sealed fluid droplets formed in FIGS. 8-10.

FIG. 11 shows the individual droplets of FIG. 8-10 used in a simple display device. FIG. 11 provides a cross sectional side view of a display made from a plurality of display ink droplets 1104, 1108, 1112 distributed over a first electrode 1114. Electrode 1114 is formed over substrate 1116. A sealing film 1120 seals each droplet. The sealing film may or may not be continuous across the surface of the display. Strengthening material 1124, which may be a flexible or elastomeric material, deposited around sealing film 1120 reinforces the sealing film 1120 and can also enhance the overall structural strength of display 1100.

A transparent conductive layer 1128 such as ITO on Mylar™ deposited (laminated in the case of ITO on Mylar) over strengthening material 1124 serves as a second electrode. By connecting a power source across first electrode 1114 and transparent conductive layer 1128, a controllable electric field can be generated across ink droplets 1104, 1108, 1112.

Display 1100 includes a plurality of pixels. Each pixel corresponds to one or more droplets. Each pixel also corresponds to an electrode that can apply an electric field to all droplets in the pixel. In an electrophoretic display, the electric field moves charged particles in display ink droplets such as droplets 1104, 1108, 1112. The distribution of charged particles creates an image. A transparent protective layer formed over transparent conductive layer 1128 protects the display. In one embodiment, the transparent conductive layer 1128 and the transparent protective layer are integrated into a single top layer, such as a sheet of ITO coated Mylar.

One disadvantage of the structure illustrated in FIG. 11 is that the illustrated display has a low fill factor. The spacing and curvature of the droplets results in large areas that are not accessible to the charged particles that form an electrophoretic display image. In particular, the space between droplets such as space 1150 and space 1154 do not contribute to image formation. Thus, to improve the fill factor, the droplets should be placed closer together.

When droplets are placed very close together, surface tension forces the droplets to agglomerate. Some droplets may coalesce into a single larger droplet, but many of the droplets remain surrounded and separated by a sealing film. As the solvent evaporates, a high density cell structure results. This dense cell structure is ideally suited for use in a high fill factor display.

Figure 12:
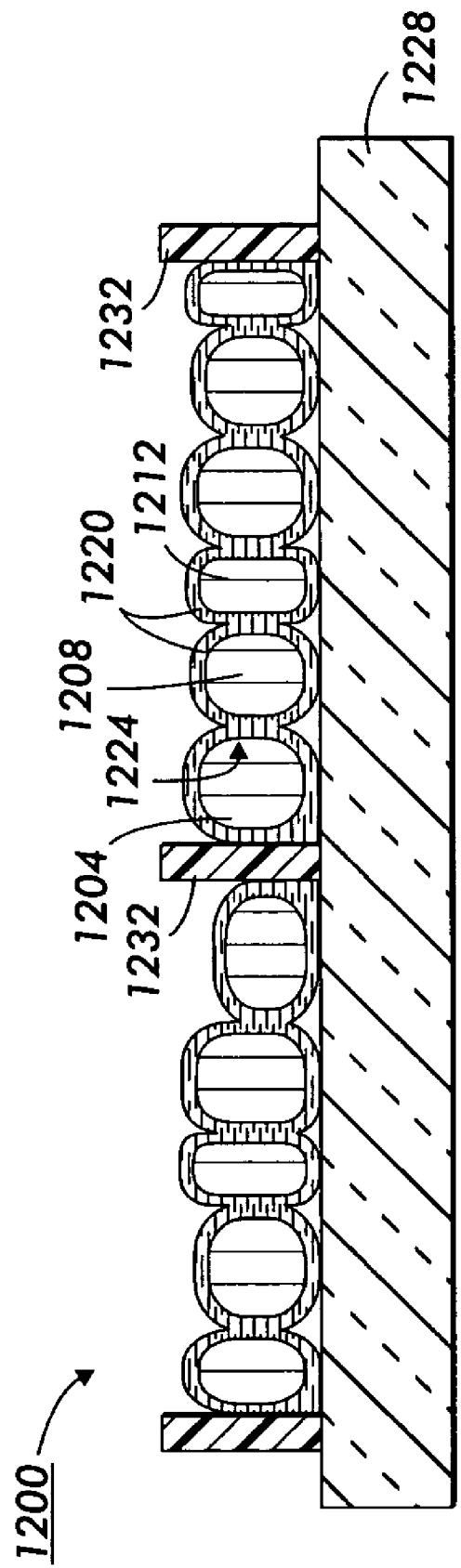
FIG. 12 shows a side cross sectional view of a high fill factor display using the sealed fluid droplets of FIG. 10 and walls or pillars to support a top cover.

FIG. 12 shows a cross sectional side view of a high fill factor display 1204 formed by placing droplets very close together. In the structure of FIG. 12, a number of droplets 1204, 1208, 1212 are deposited very close together in a sealing solution. As the sealing solution evaporates, the droplets agglomerate resulting in very little spacing between adjacent droplets such as droplet 1204 and 1208. In the illustrated embodiment, only sealing film 1220 separates adjacent droplets. Thus the sealing film alone prevents display ink flow between adjacent droplets. Thus the sealing film should be of reasonable strength and thickness to withstand the ink charged particle motion.

Droplet agglomeration also usually produces less rounded structures compared to the separated droplets shown in the display structure of FIG. 11. Pressure from adjacent droplets causes the droplet side walls, such as side wall 1224 of droplet 1204, to form a larger angle with substrate 1228 surface than would otherwise result. The increased angle is particularly well suited for electrophoretic display structures in which a "squarish" droplet increases display fill factor.

FIG. 12 also shows walls 1232 used to provide additional support, both to droplet walls and to support a protective surface including a top electrode (not shown) deposited over the droplets. Pillars may be substituted for walls 1232' when the walls are not needed to confine or support the ink droplets. The walls 1232 or pillars may be formed from a variety of substances, including but not limited to polymer structures.

Figure 13:
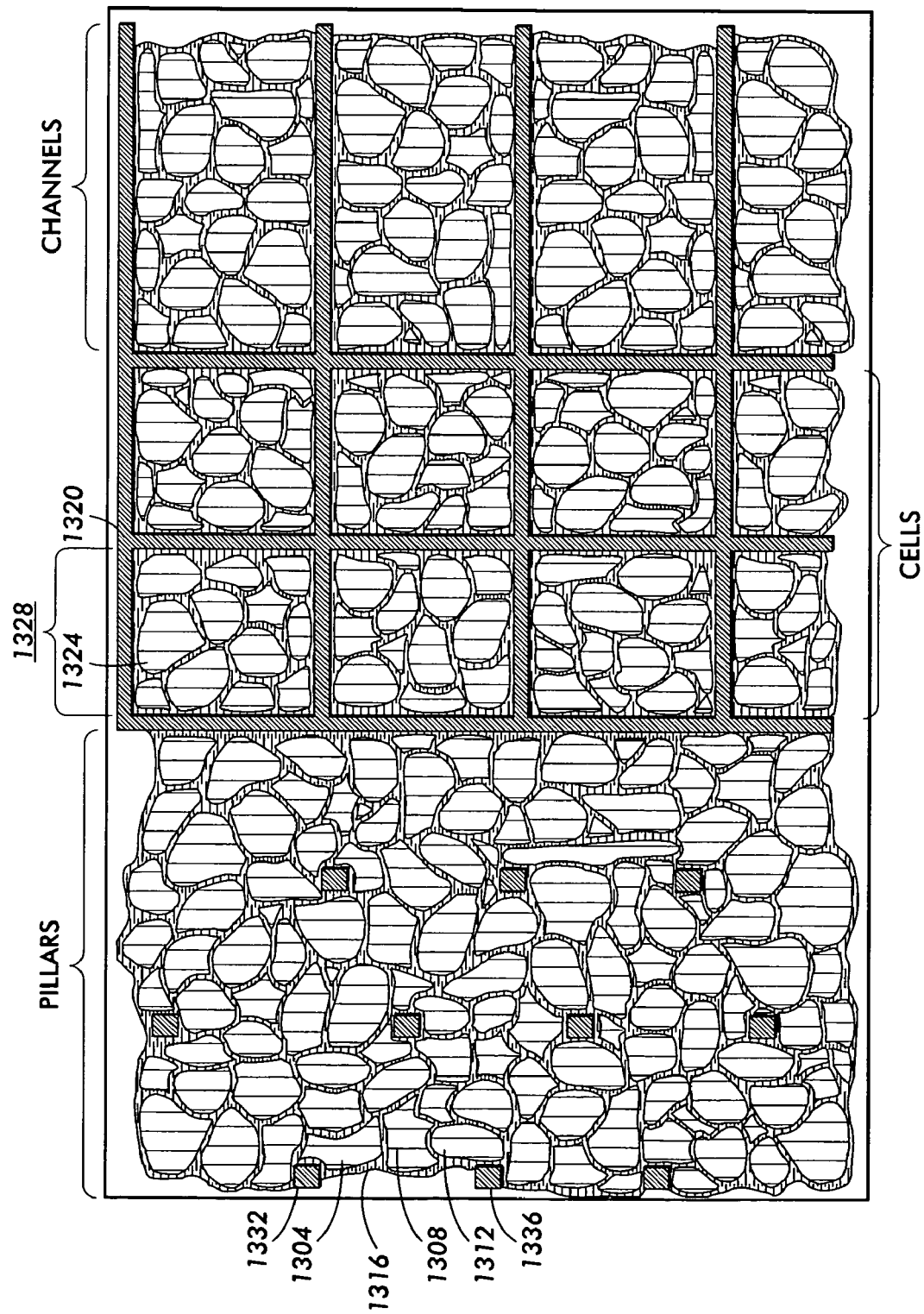
FIG. 13 shows a top view of the high fill factor display structure of FIG. 12.

FIG. 13 shows a top view of a display formed by agglomerated droplets such as droplet 1304, 1308, 1312. Sealing film 1316 separates adjacent agglomerated display ink droplets. An agglomerated display ink droplet may be completely surrounded on all sides by droplets such that all sides and corners of the droplet are in contact with adjacent droplets in a "honeycomb" style structure. In one embodiment, structural walls 1320 may separate clusters of droplets such that each droplet, such as droplet 1324, is a mini "droplet cell" inside a larger cell structure 1328 defined by structural walls 1320. The larger cell structure may include a plurality of droplet cells.

Alternatively, when the strength and uniformity provided by structural wall 1320 is unnecessary and high fill factors are the primary concern, the walls 1320 can be replaced by pillars. Pillars, such as pillars 1332, 1336 allow space otherwise occupied by display walls to be filled with display ink. Thus, using pillars instead of walls decreases cell symmetry through the display, but increases the percentage of display area occupied by addressable display ink In regions of the display that rely on pillars, the electrode size, shape and position determine the pixel size, shape and position. Ideally, the shape and size of the electrode is larger than the droplet size such that each electrode covers several droplet cells. Allowing each electrode to cover several cells allows the electrode edge which corresponds to a pixel edge to have a high probability of being in close proximity to a droplet edge. Thus this droplet edge serves as a barrier to minimize motion of charged particles between adjacent pixels.

The preceding description has described a method of making a display. A number of details have been provided in the description, such as materials used in the inks, walls and sealing material. However, such details are provided as examples to facilitate understanding of the invention. These details should not be used to limit the invention. Instead, the invention should only be limited by the claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of forming cells in a display comprising the operations of:
    depositing a liquid fluorocarbon polymer based sealing solution onto a substrate;
    ejecting a droplet of liquid display fluid into the sealing solution, wherein the display fluid is an isoparaffinic solvent based ink, such that surface tension between the liquid display fluid and the liquid sealing solution causes the liquid display fluid droplet to be immersed in the liquid sealing solution; and,
    converting at least a portion of the sealing solution from a liquid to a solid such that the solid portion seals the droplet of display fluid.

2. The method of claim 1 wherein the sealing solution completely surrounds the droplet of display fluid such that after solidification, the solid portion encapsulates the droplet of display fluid.

3. The method of claim 1 wherein the display fluid wets the substrate such that the solid portion overlays but does not encapsulate the droplet of display fluid.

4. The method of claim 1 further comprising:
    overcoating the solid portion around the droplet of display fluid with a protective layer for enhanced mechanical stability.

5. The method of claim 4 further comprising:
    attaching an electrode to the protective layer to move charged particles in the droplet of display fluid.

6. The method of claim 4 wherein the overcoating is a polymer.

7. The method of claim 1 further comprising:
    forming structural walls to form a plurality of cells prior to depositing of the sealing solution; and,
    depositing the sealing solution into each cell of the plurality of cells.

8. The method of claim 7 wherein the cell is less than 1000 microns by 1000 microns.

9. The method of claim 1 wherein the substrate includes electrodes to form a backplane of a display.

10. The method of claim 9 wherein the electrodes form an active matrix backplane.

11. The method of claim 1 wherein the ejecting of the droplet of display fluid is done by an ink jet.

12. The method of claim 1 wherein the display fluid is an electrophoretic ink including a first set of charged particles.

13. The method of claim 12 wherein the display fluid is a two-particle electrophoretic ink including a second set of charged particles, the charge polarity of the seconds set of charged particles different than the polarity of the first set of charged particles.

14. The method of claim 1 wherein the sealing solution produces a fluorocarbon polymer sealing film around the droplet of display fluid.

15. The method of claim 1 further comprising the operation of: depositing a second droplet a preset distance from the droplet of display fluid, the second droplet of display fluid also immersed in the sealing solution such that a corresponding portion of the sealing solution solidifies around the second droplet of display fluid.

16. The method of claim 15 wherein the second droplet is spaced from the first droplet such that a strengthening material can be deposited between the first droplet and the second droplet.

17. The method of claim 15 where the preset distance is less than the size of the droplets such that the first droplet and second droplet agglomerate.

18. The method of claim 17 wherein only a thin sealing film separates the display fluid in the first droplet from display fluid in the second droplet.

19. The method of claim 18 wherein the sealing film thickness is less than 10 microns.

20. The method of claim 1 wherein the sealing film thickness is less than the height of the droplet of display fluid.

21. The method of claim 1 wherein the sealing solution includes a solvent carrier, the solvent carrier to evaporate and leave a sealing film that solidifies to form the solid portion and seal the droplet of display fluid.

22. The method of claim 1 wherein the ejecting of the droplet of display fluid is done by an array of micropipettes.

23. The method of claim 1 wherein the sealing solution includes a UV curable polymer such that exposure to UV radiation converts the at least a portion of the sealing solution from a liquid to a solid to form the solid portion.

24. The method of claim 1 further comprising:
    depositing a strengthening material over the droplet of display fluid;
    forming an electrode over the strengthening material such that when energized, the electrode moves charged particles in the droplet of display fluid.

25. The method of claim 1 wherein the droplet of display fluid is a first color, the method further comprising the operation of:
    depositing a second droplet of display fluid having a second color different from the first color, the second droplet of display fluid deposited adjacent the droplet of display fluid of the first color.

26. The method of claim 1 further comprising the operations of:
    ejecting a second droplet of liquid display fluid having a second color different from a first color of the first droplet of liquid display fluid into the sealing solution such that the surface tension between the second droplet of liquid display fluid and the liquid sealing solution causes the second droplet of liquid display fluid to be immersed in the liquid sealing solution in a position approximately adjacent to the first droplet of liquid display fluid.

27. The method of claim 26 further comprising the operations of repeating the ejecting of droplets of said first color and droplets of said second color to create a repeated pattern the display.

28. The method of claim 1 further comprising the operation of:
waiting for the liquid display fluid to immerse into the liquid sealing solution such that a bottom surface of the liquid display fluid deforms and directly contacts the substrate, a top surface of the liquid display fluid in direct contact with the liquid sealing solution.

* * * * *

UNITED STATES PATENT AND TRADEMARK OFFICE
CERTIFICATE OF CORRECTION

PATENT NO. : 7,597,925 B2  
APPLICATION NO. : 10/879774  
DATED : October 6, 2009  
INVENTOR(S) : Jurgen H. Daniel It is certified that error appears in the above-identified patent and that said Letters Patent is hereby corrected as shown below:

In the Specification

Column 1, line 4, please insert -- STATEMENT REGARDING FEDERALLY SPONSORED RESEARCH OR DEVELOPMENT This Invention was made with United States Government support under Cooperative Agreement No. 70NANB0H3033 awarded by the National Institute of Standards and Technology (NIST). The United States Government has certain rights in the invention. -- as a separate paragraph before the heading "BACKGROUND".

Signed and Sealed this  
Third Day of September, 2013

Teresa Stanek Rea  
*Acting Director of the United States Patent and Trademark Office*